US010259404B2

(12) United States Patent
Findlay et al.

(10) Patent No.: US 10,259,404 B2
(45) Date of Patent: Apr. 16, 2019

(54) APPARATUS AND METHOD FOR ELECTRONIC VEHICLE PLATE WITH VARIABLE IMAGE USING WIRELESS POWER AND WIRELESS COMMUNICATIONS

(71) Applicant: Compliance Innovations, LLC, Columbia, SC (US)

(72) Inventors: William David Findlay, Columbia, SC (US); Brian Mayer Bannister, Columbia, SC (US); Richard Raymond Butcher, Irmo, SC (US); Charles Edward Greene, Cabot, PA (US)

(73) Assignee: Compliance Innovations, LLC, Columbia, SC (US)

( * ) Notice: Subject to any disclaimer, the term of this patent is extended or adjusted under 35 U.S.C. 154(b) by 0 days.

(21) Appl. No.: 14/822,545

(22) Filed: Aug. 10, 2015

(65) Prior Publication Data

US 2016/0039364 A1    Feb. 11, 2016

Related U.S. Application Data

(60) Provisional application No. 62/034,987, filed on Aug. 8, 2014.

(51) Int. Cl.
*B60R 13/10* (2006.01)
*G01S 19/14* (2010.01)

(52) U.S. Cl.
CPC ............ *B60R 13/105* (2013.01); *G01S 19/14* (2013.01)

(58) Field of Classification Search
CPC .................................................. B60R 13/105
(Continued)

(56) References Cited

U.S. PATENT DOCUMENTS 1,476,580 A * 12/1923 Baxter ...................... G09F 7/08
40/207
2,322,135 A *  6/1943 Howell .................. B60R 13/10
40/207
(Continued)

FOREIGN PATENT DOCUMENTS

JP          1924002561 Y       3/1925
JP          H0380490 U        8/1991
(Continued)

OTHER PUBLICATIONS

International Search Report and Written Opinion for International Application No. PCT/US2015/044506, dated Oct. 28, 2015.
(Continued)

*Primary Examiner* — Kevin Kim
(74) *Attorney, Agent, or Firm* — Nelson Mullins Riley & Scarborough LLP

(57) ABSTRACT

Systems, apparatus, and methods related to electronic vehicle plates are described herein. In some embodiments, an apparatus includes a display plate and an electronic display. The display plate is configured to be disposed between a license plate and an exterior of a vehicle when the license plate is mounted to the exterior of the vehicle. The electronic display is coupled to the display plate such that at least a portion of the electronic display is visible through an aperture in the license plate when the license plate is mounted to the exterior of the vehicle. The electronic display is configured to display a status indicator of the vehicle through the aperture in the license plate.

17 Claims, 10 Drawing Sheets

(58) Field of Classification Search
USPC .............................. 340/468; 40/200, 204, 206
See application file for complete search history.

(56) References Cited

U.S. PATENT DOCUMENTS

| | | | |
|---|---|---|---|
| 3,895,987 | A | 7/1975 | Loreck |
| 5,579,008 | A | 11/1996 | Hulderman et al. |
| 5,608,391 | A | 3/1997 | Bantli et al. |
| 5,621,571 | A | 4/1997 | Bantli et al. |
| 5,657,008 | A * | 8/1997 | Bantli ............... B60R 13/10 340/933 |
| 5,963,129 | A | 10/1999 | Warner |
| 6,404,327 | B1 | 6/2002 | Naddeo |
| 7,551,088 | B2 | 6/2009 | Findlay et al. |
| 2002/0195490 | A1 | 12/2002 | Gehlot et al. |
| 2003/0200227 | A1 | 10/2003 | Ressler |
| 2004/0189493 | A1 | 9/2004 | Estus et al. |
| 2006/0061456 | A1 | 3/2006 | Tanaka et al. |
| 2007/0008084 | A1 | 6/2007 | Wu et al. |
| 2007/0171077 | A1 | 7/2007 | Kawarizadeh |
| 2007/0285361 | A1 | 12/2007 | Jovanovich |
| 2008/0117032 | A1 | 5/2008 | Dillon |
| 2008/0252457 | A1 | 10/2008 | Findlay et al. |
| 2009/0193694 | A1 | 8/2009 | Cordell et al. |
| 2009/0288320 | A1 | 11/2009 | El Emam |
| 2011/0078933 | A1 | 4/2011 | Lukawitz et al. |
| 2011/0295697 | A1 | 12/2011 | Boston et al. |
| 2012/0280654 | A1 * | 11/2012 | Kim ............... H01M 10/44 320/109 |
| 2013/0006775 | A1 | 1/2013 | Jordan et al. |
| 2014/0090280 | A1 * | 4/2014 | Cunningham ....... B60R 25/104 40/201 |
| 2015/0194082 | A1 * | 7/2015 | McEwan ............... G09F 21/048 40/209 |
| 2015/0353031 | A1 * | 12/2015 | Cairo ............... B60R 25/33 340/425.5 |

FOREIGN PATENT DOCUMENTS

| | | |
|---|---|---|
| JP | H1999120489 A | 4/1999 |
| JP | 2000249752 A | 9/2000 |
| JP | 2002002410 | 1/2002 |
| JP | 2008094361 A | 4/2008 |
| JP | 2008284967 A | 11/2008 |

OTHER PUBLICATIONS

Compliance Innovations . . . Bringing the License Plate into the 21$^{st}$ Century, www.complianceinnovations.com, Retrieved from the Internet Aug. 4, 2015, 3 pages.

If You Live in South Carolina an Electronic License Plate Could Soon Tattle on You, www.theblaze.com/stories/2013/06/13/if-you-live-in-south-carolina-an-electronic-lice . . . Liz Klimas, Jun. 13, 2013.

The Latest Tech Frontier: Electronic License Plates, http://nation.time.com/2013/09/10/the-latest-tech-frontier-electronic-license-plates/ Katy Steinmetz, Sep. 10, 2013.

"If You Live in South Carolina an Electronic License Plate Could Soon Tattle on You," The Blaze, [online] Jun. 13, 2013. [retrieved on Aug. 4, 2015]. Retrieved from the Internet :<http://www.theblaze.com/stories/2013/06/13/if-you-live-in-south-carolina-an-electronic-license-plate-could-soon-tattle-on-you/>.

Steinmetz, Katy. "The Latest Tech Frontier: Electronic License Plates," TIME.com. [online] Sep. 10, 2013. [retrieved on Aug. 4, 2015]. Retrieved from the Internet:<http://nation.time.com/2013/09/10/the-latest-tech-frontier-electronic-license-plates/>.

European Search Report for corresponding European application No. 15830441.0, dated Apr. 24, 2018.

Japanese Office Action for corresponding Japanese application No. 2017-508098, dated Mar. 2, 2018.

Canadian Office Action for corresponding Canadian application No. 2,957,686, dated Mar. 5, 2018.

* cited by examiner

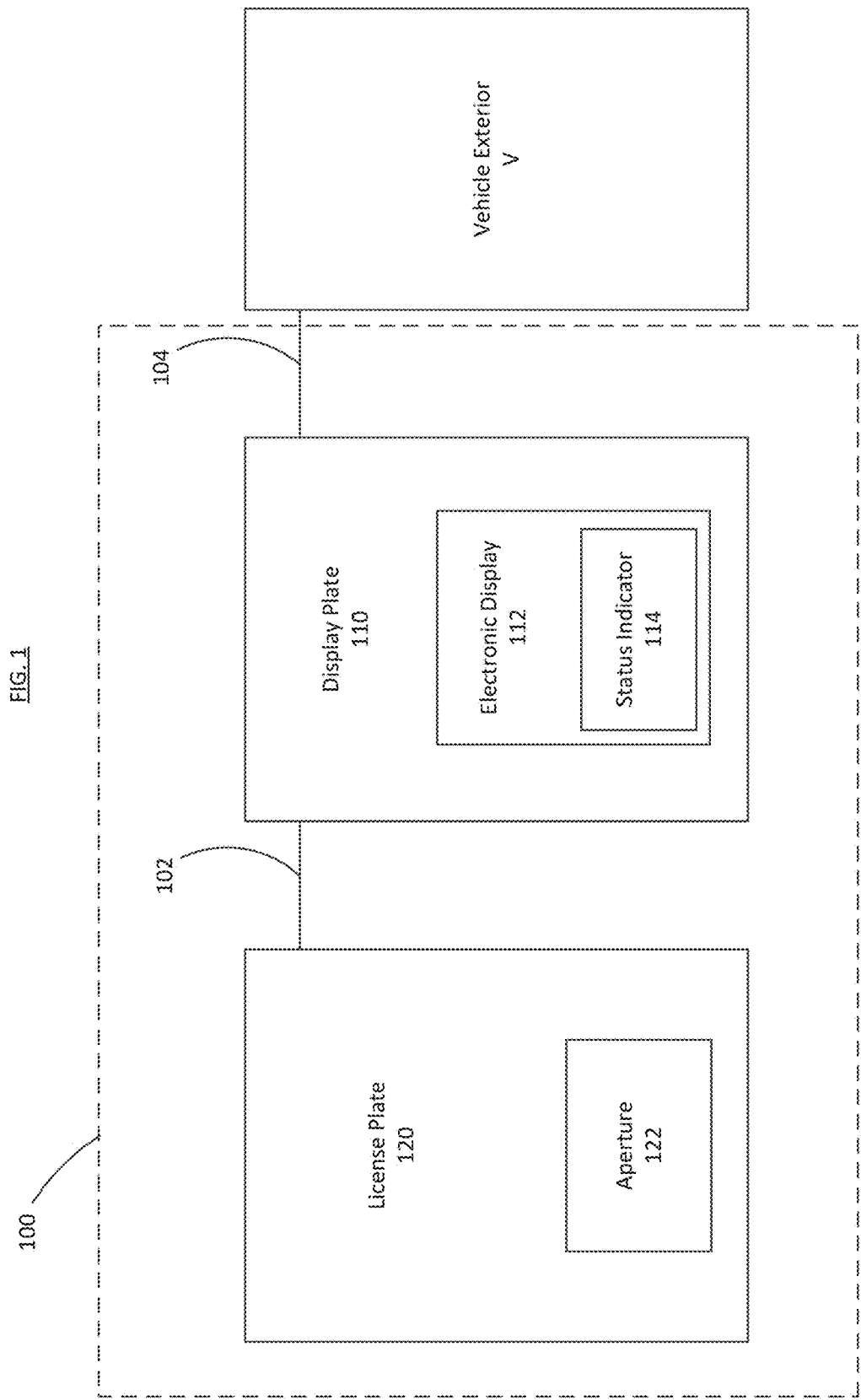

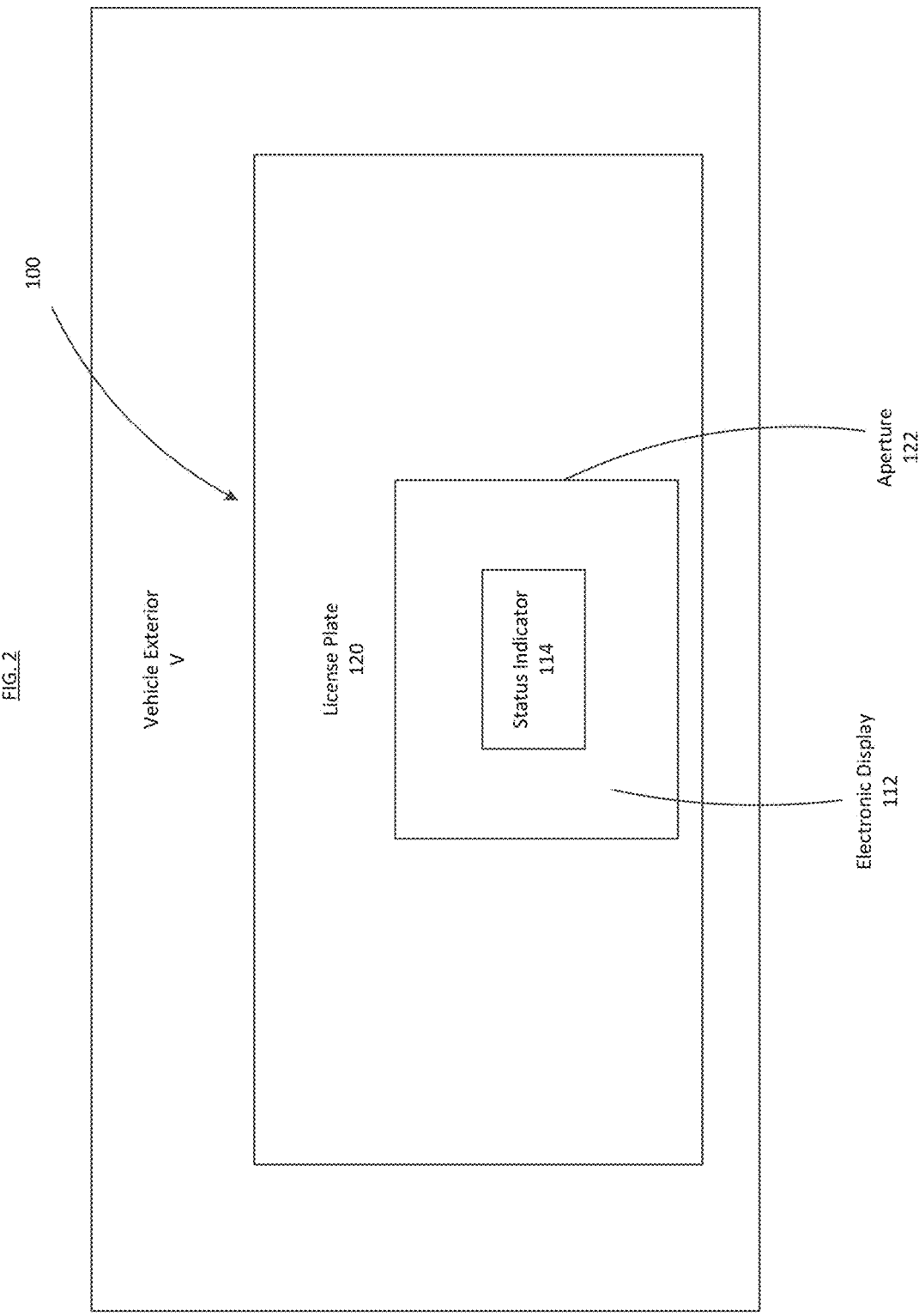

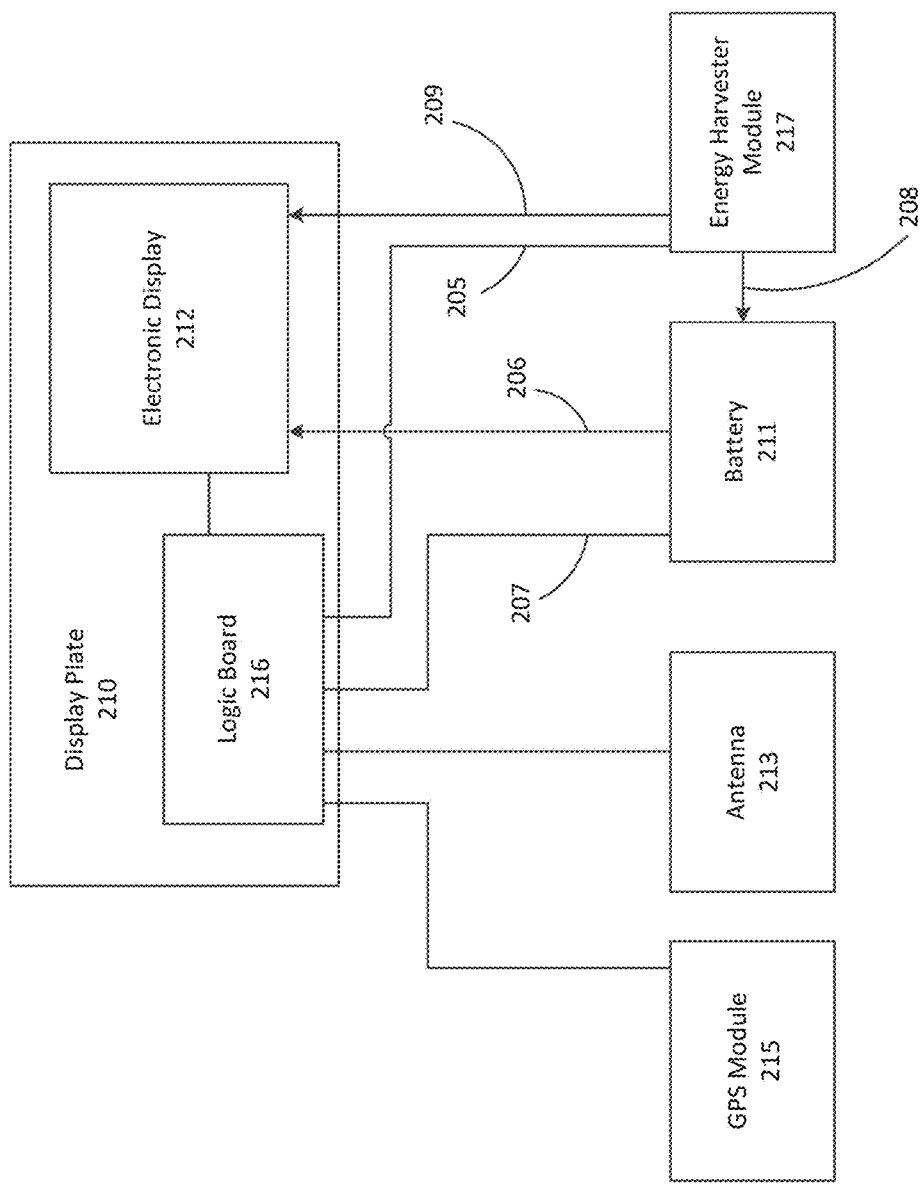

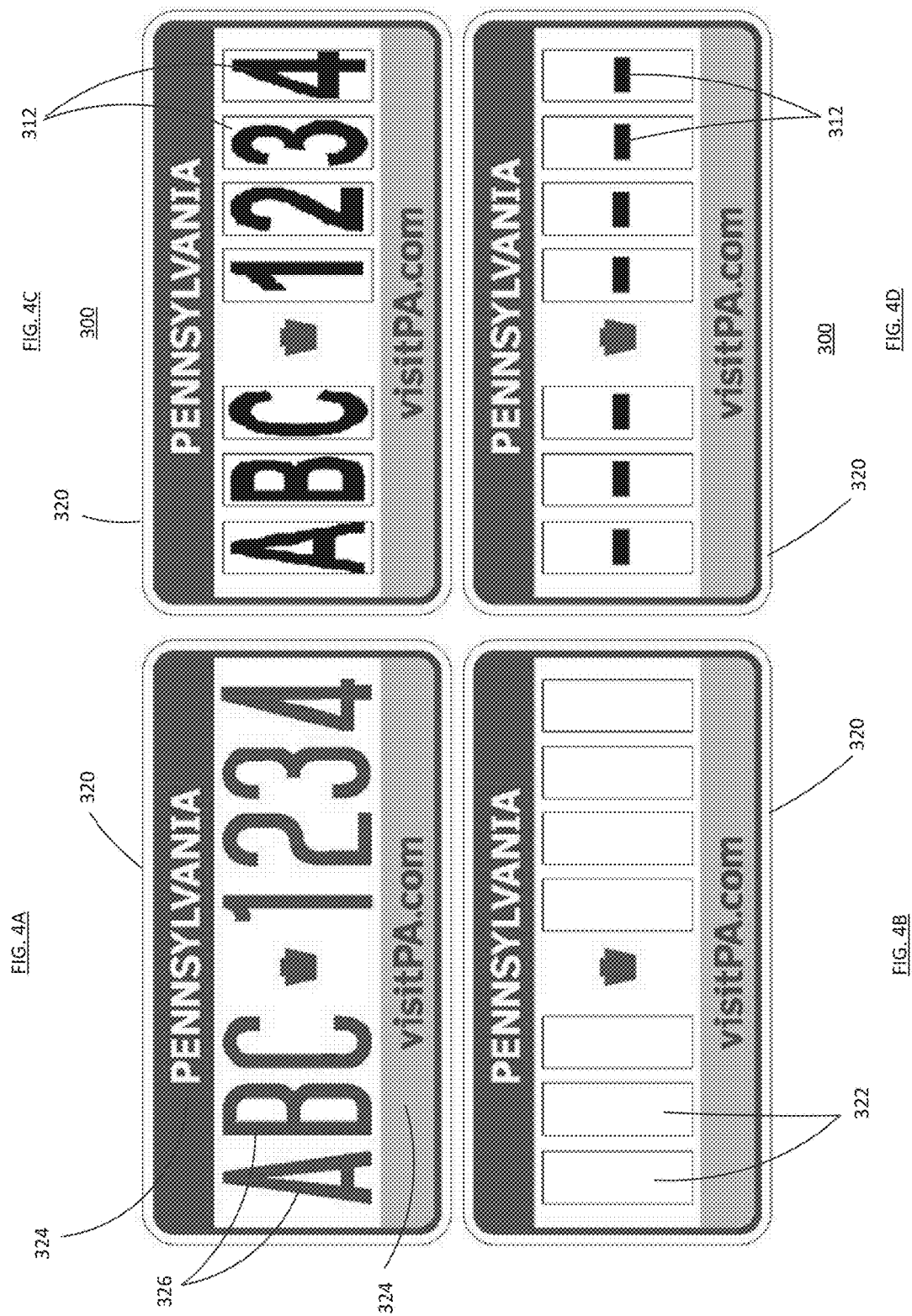

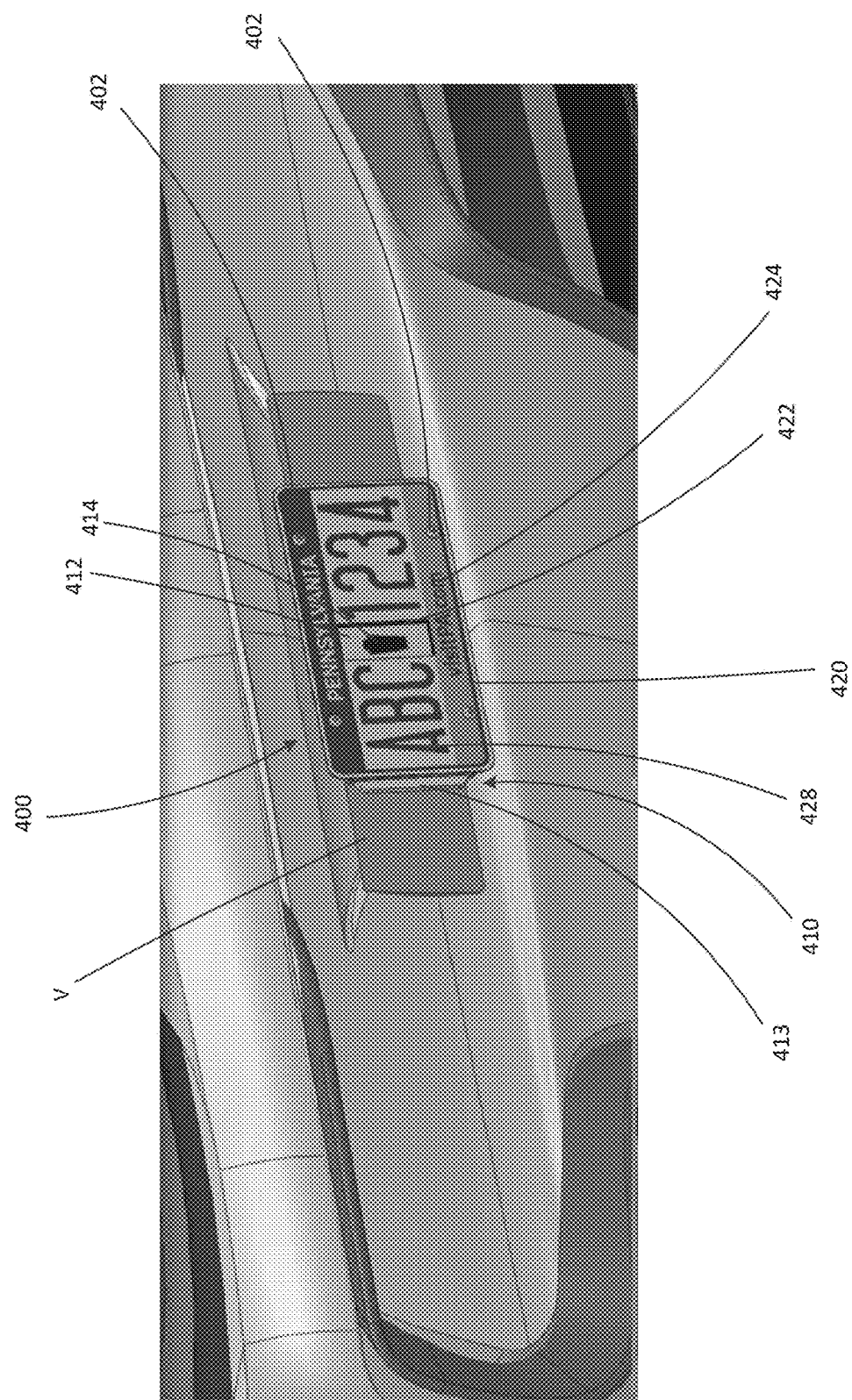

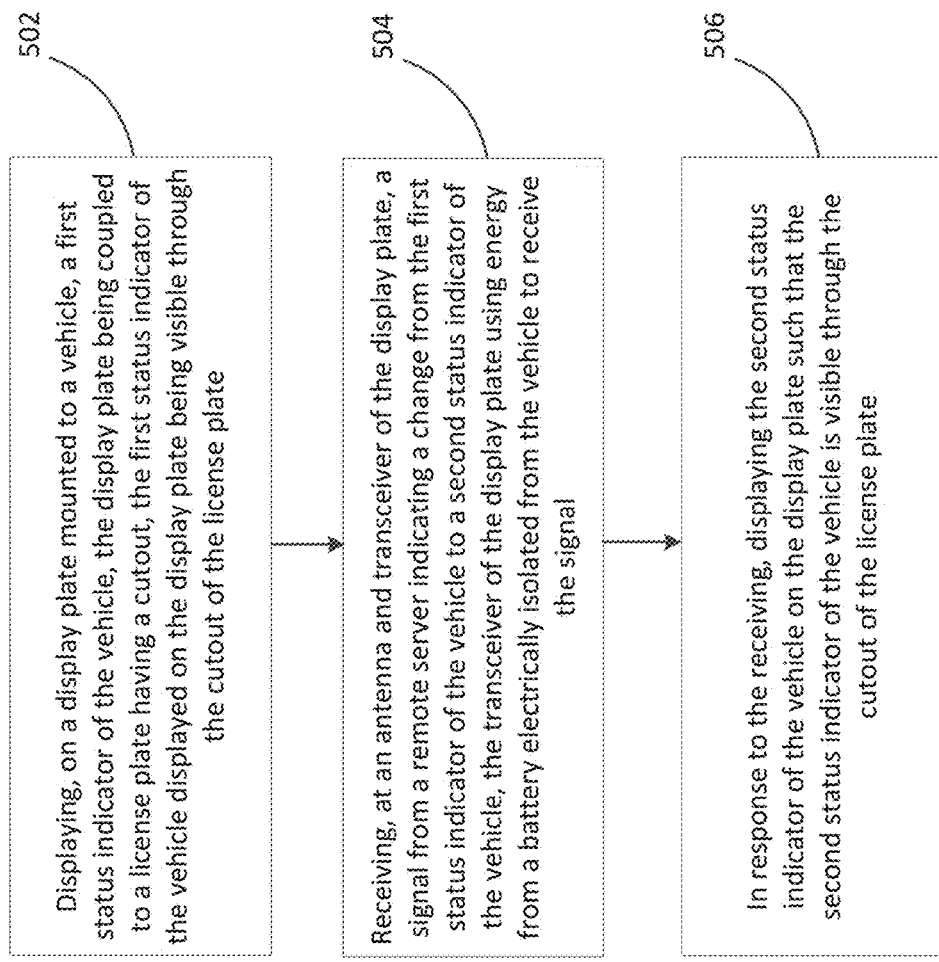

FIG. 6
500

502 — Displaying, on a display plate mounted to a vehicle, a first status indicator of the vehicle, the display plate being coupled to a license plate having a cutout, the first status indicator of the vehicle displayed on the display plate being visible through the cutout of the license plate 504 — Receiving, at an antenna and transceiver of the display plate, a signal from a remote server indicating a change from the first status indicator of the vehicle to a second status indicator of the vehicle, the transceiver of the display plate using energy from a battery electrically isolated from the vehicle to receive the signal 506 — In response to the receiving, displaying the second status indicator of the vehicle on the display plate such that the second status indicator of the vehicle is visible through the cutout of the license plate

600

600

600

600

APPARATUS AND METHOD FOR ELECTRONIC VEHICLE PLATE WITH VARIABLE IMAGE USING WIRELESS POWER AND WIRELESS COMMUNICATIONS

CROSS-REFERENCE TO RELATED APPLICATIONS

This application claims priority to and the benefit of U.S. Provisional Application No. 62/034,987, filed Aug. 8, 2014 and entitled "Apparatus and Method for Electronic Vehicle Plate with Variable Image Using Wireless Power and Wireless Communications," the disclosure of which is hereby incorporated by reference in its entirety.

BACKGROUND

The embodiments described herein relate to systems, apparatus, and methods for displaying information on an electronic vehicle plate using wireless power and wireless communication.

In many jurisdictions, license plates are required to display a variety of information depending on the requirements of a particular jurisdiction. Existing license plates, however, often display outdated information. For example, government-issued stickers often incorrectly indicate that a vehicle's registration is in compliance when the registration has been suspended. To identify up-to-date registration status, law enforcement usually manually compares the vehicle's registration information with a database, involving an inefficient use of time and resources. To properly enforce vehicle restrictions, law enforcement needs faster and easier access to accurate and up-to-date vehicle registration information.

Therefore, a need exists for an electronic vehicle plate that can be wirelessly reconfigured by a governmental authority.

SUMMARY

Systems, apparatus, and methods related to electronic vehicle plates are described herein. In some embodiments, an apparatus includes a display plate and an electronic display. The display plate is configured to be disposed between a license plate and an exterior of a vehicle when the license plate is mounted to the exterior of the vehicle. The electronic display is coupled to the display plate such that at least a portion of the electronic display is visible through an aperture in the license plate when the license plate is mounted to the exterior of the vehicle. The electronic display is configured to display a status indicator of the vehicle through the aperture in the license plate.

BRIEF DESCRIPTION OF THE DRAWINGS

FIG. 1 is a schematic illustration of an electronic vehicle plate system according to an embodiment.

FIG. 2 is a schematic illustration of a front view of the electronic vehicle plate system of FIG. 1 in a mounted configuration.

FIG. 3 is a schematic illustration of a back plate of an electronic vehicle plate system according to an embodiment.

FIG. 4A is an illustration of a license plate to be used in an electronic vehicle plate system according to an embodiment.

FIG. 4B is an illustration of the license plate of FIG. 4A in a configuration with defined apertures.

FIG. 4C is an illustration of an electronic vehicle plate system including the license plate of FIG. 4B according to an embodiment.

FIG. 4D is an illustration of the electronic vehicle plate system including the license plate of FIG. 4B according to an embodiment.

FIG. 5B is a perspective view illustration of the electronic vehicle plate system of FIG. 5A in a first configuration according to an embodiment.

FIG. 6 is a flow chart of a method of operating an electronic vehicle plate system according to an embodiment.

DETAILED DESCRIPTION

Figure 5A:
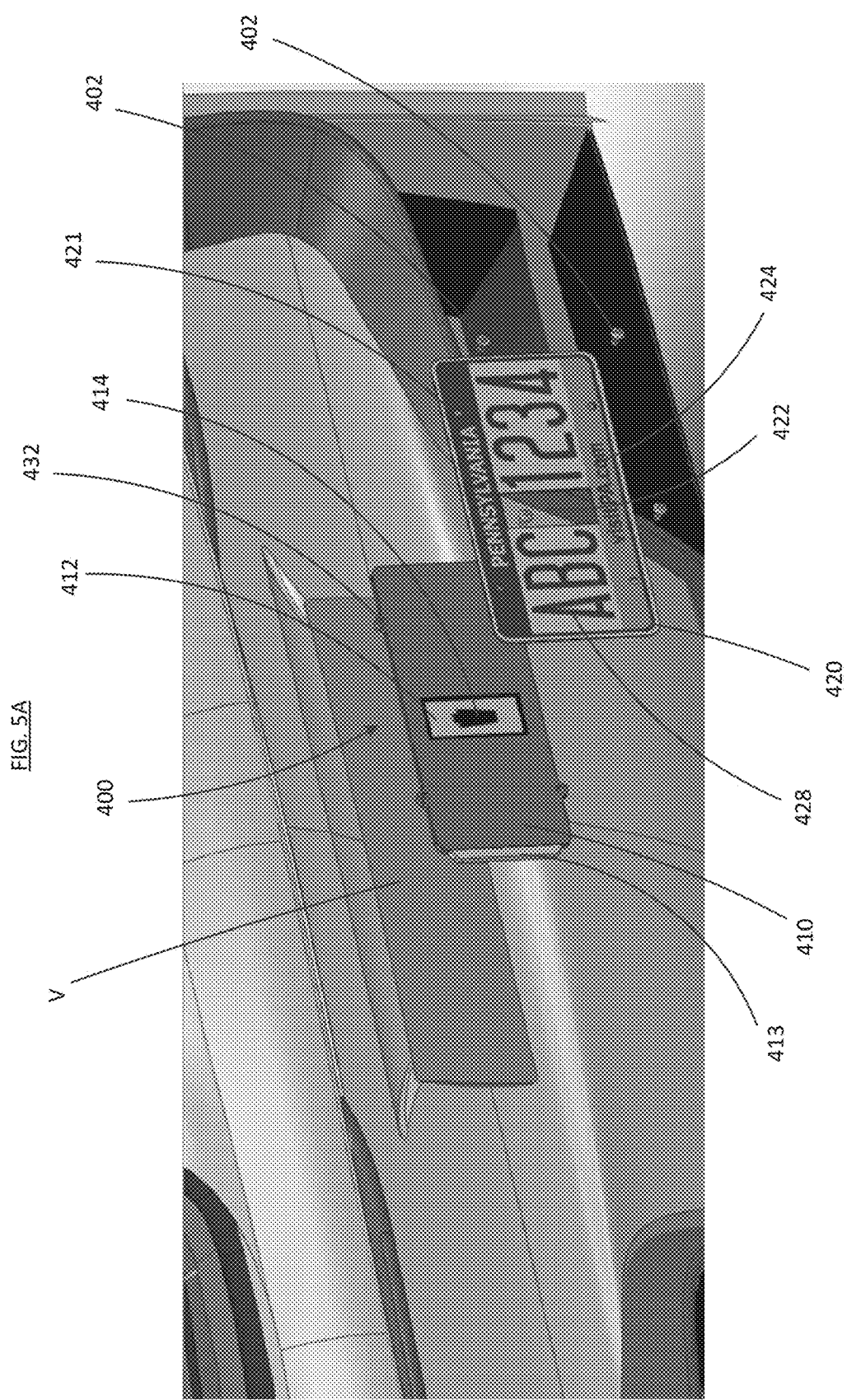
FIG. 5A is an exploded perspective view of an electronic vehicle plate system according to an embodiment.

The embodiments described herein relate to systems, apparatus, and methods for displaying information on an electronic vehicle plate using wireless power and wireless communication.

An electronic vehicle plate can maintain an image without power and can allow a managing authority, such as a motor vehicle agency or a law enforcement agency, to change the image via wireless communication. For example, a motor vehicle agency can remotely designate an electronic vehicle plate as suspended, revoked, or expired substantially instantly regardless of the location of the vehicle. The electronic vehicle plate can include an electronic display that can display alphanumeric identification, a registration compliance status symbol, and/or another status symbol. The electronic vehicle plate can include an antenna that can be used to manage communications between the managing authority and the electronic vehicle plate. The communications can be via cellular, WiFi®, Bluetooth®, satellite, and/or other wireless networks.

Additionally, the alphanumeric identification and/or a registration compliance status symbol can be displayed by the electronic display on electronic paper. Because the electronic vehicle plate requires no power consumption to maintain an image on electronic paper, the electronic vehicle plate can rely on an internal battery for the operation of the electronic vehicle plate and does not need external power. As a result, the electronic vehicle plate can be mounted on a vehicle with no electrical connection to the vehicle. Additionally, the electronic vehicle plate may be configured to need no electronic connection to any computing, power, and/or communications resources of the vehicle.

In some embodiments, an apparatus includes a display plate and an electronic display. The display plate is configured to be disposed between a license plate and an exterior of a vehicle when the license plate is mounted to the exterior of the vehicle. The electronic display is coupled to the display plate such that at least a portion of the electronic display is visible through an aperture in the license plate when the license plate is mounted to the exterior of the vehicle. The electronic display is configured to display a status indicator of the vehicle through the aperture in the license plate. The electronic display can be, for example, an electronic paper ("e-paper"). The status indicator can indicate, for example, that the vehicle is non-compliant (e.g., the vehicle's registration is expired).

In some embodiments, a method includes displaying a first status indicator of a vehicle on a display plate mounted to the vehicle. The display plate is coupled to a license plate having an aperture. The aperture can be, for example, a cutout. The first status indicator of the vehicle is displayed on the display plate so that the first status indicator is visible through the cutout of the license plate. The first status indicator can indicate, for example, that the car is compliant with local vehicle regulations. The method includes receiving a signal from a remote server at an antenna of the display plate. The remote server can be operated, for example, by a government-affiliated authority such as the Department of Motor Vehicles. The signal indicates a change from the first status indicator of the vehicle to a second status indicator of the vehicle. The antenna and a transceiver of the display plate collectively use energy from a battery electrically isolated from the vehicle to receive, detect, and interpret the electrical signal. The transceiver can convert information in the received signal into a status indicator (e.g., the first status indicator or the second status indicator). In response to the receiving, the second status indicator of the vehicle is displayed on the display plate such that the second status indicator of the vehicle is visible through the aperture of the license plate. The second status indicator can indicate, for example, that the car is no longer compliant with the local vehicle regulations. In other instances, the first status indicator can indicate that the car is non-compliant with the local vehicle regulations and the second status indicator can indicate that the car is compliant.

In some embodiments, an apparatus includes a vehicle plate configured to be mounted to an external surface of a vehicle and an electronic display adjacent the vehicle plate. The vehicle plate has identification information of the vehicle thereon. The identification information can be, for example, a license plate number issued by a government-regulated authority for the vehicle. The electronic display is adjacent to the vehicle plate such that the electronic display is mounted to the external surface of the vehicle with the vehicle plate. At least a portion of the electronic display is visible with the identification information of the vehicle plate. The electronic display is configured to display a first status indicator of the vehicle during a first time period and a second status indicator of the vehicle during a second time period mutually exclusive of the first time period. The first status indicator of the vehicle is visible with the identification information of the vehicle plate during the first time period. The second status of the vehicle is visible with the identification information of the vehicle plate during the second time period.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a display" is intended to mean a single display or a set of displays.

FIG. 1 is a schematic illustration of an electronic vehicle plate system 100 mounted to a vehicle exterior V according to an embodiment. The system 100 includes a display plate 110 and a license plate 120. Alternatively, the system 100 can include only the display plate 110, which can be attached to a license plate 120 or used separately from a license plate. The display plate 110 includes an electronic display 112, which can display vehicle-related information. The displayed information is referred to herein as a "status indicator" 114. The license plate 120 defines an aperture 122 (e.g., a manufactured opening or a post-manufacturer cut out) such that at least a portion of the electronic display 112 is visible through the aperture 122 when the system is mounted to the vehicle exterior V. FIG. 2 is a schematic illustration of the system 100 in an assembled configuration from a front view showing that, when the license plate 120 is mounted to the vehicle exterior V, at least a portion of the electronic display 112 is visible through the aperture 122 in the license plate 120. In particular, the status indicator 114 is visible through the aperture 122 in the license plate 120. In this manner, anyone (e.g., the public and/or law enforcement officials) approaching the vehicle can observe the status of the vehicle or other vehicle-related information displayed via the electronic display 112.

As shown in FIG. 1, the display plate 110 can be disposed (at least partially) between the license plate 120 and the vehicle exterior V when the system 100 is mounted to the vehicle exterior V. In some embodiments, as indicated by first coupling 102 and second coupling 104, the license plate 120 can be mounted to the vehicle exterior V via the display plate 110. In other words, the license plate 120 can be mounted to the display plate 110, and the display plate 110 can be mounted to the vehicle exterior V. The license plate 120 can be mounted to the display plate 110 via a first attachment mechanism, and the display plate 110 can be mounted to the vehicle exterior V via a second attachment mechanism. The first attachment mechanism and the second attachment mechanism can be any suitable attachment mechanisms, such as, for example, screws or adhesives.

Alternatively, in other implementations, the license plate 120 can be mounted to the vehicle exterior V, and the display plate 110 can be attached to the license plate 120 so that the display plate 110 is mounted to the vehicle exterior V via the license plate 120. For example, the display plate 110 can be attached to the license plate 120 via an adhesive, and the license plate 120 can be attached to the vehicle exterior V via one or more screws. In other implementations, the display plate 110 and the license plate 120 can each be separately mounted to the vehicle exterior V.

The license plate 120 and/or the display plate 110 can be mounted to each other and/or the vehicle exterior V via fasteners or other suitable couplings (not shown). The fasteners can include, for example, screws. In some embodiments, the license plate 120, the display plate 110, and/or the vehicle exterior V can include screw-receiving apertures (not shown) (i.e., holes) through which one or more screws can be inserted to mount the license plate 120 and/or the display plate 110 to the vehicle exterior V. The screw-receiving apertures in the license plate 120, the display plate 110, and the vehicle exterior V can be aligned so that each screw can pass through the license plate 120, the display plate 110, and the vehicle exterior V to mount both the license plate 120 and the display plate 110 to the vehicle exterior V. In some embodiments, the backing of the license plate 120 and/or display plate 110 (or at least a portion thereof) can include a magnet capable of attaching the license plate 120 and/or display plate 110 to the vehicle exterior V.

The license plate 120 can be manufactured by the same process as a known license plate. In some embodiments, the license plate 120 can be a license plate that was issued by the government (or other authority) prior to the installation of the display plate 110 (referred to herein as an "existing license plate"). In this manner, the license plate 120 can be modified post-issuance and post-manufacturing to include the display plate 110. The license plate 120 can be made of metal, plastic, or any other suitable material, and can be sized similarly to existing license plates in the intended jurisdiction of use. For example, in the United States, the license plate 120 can be approximately 12 inches by 6 inches. In some implementations, the license plate 120 includes a substrate that is attachable to the display plate 110. For example, the license plate 120 can be in the form of a flexible sticker that attaches to the display plate 110 via an adhesive.

The display plate 110 can be any size suitable for mounting to a vehicle. For example, the display plate 110 can be the same or approximately the same size as the license plate 120. For example, if the license plate 120 is an existing license plate at approximately 12 inches by 6 inches, then the display plate 110 can also be 12 includes by 6 inches. The width of the display plate 110 could also be the same as the width of the license plate 120. In some implementations, however, the display plate 110 can have a length, height and/or width that is greater or smaller than a length, height and/or width of the license plate 120. For example, the display plate 110 can have a length and height small enough so that the entire display plate is hidden behind the license plate. In another example, the display plate 110 can have a length and/or height greater than that of the license plate 120 so that at least a portion of the display plate 110 protrudes beyond the license plate 120 and is visible to the public. In some implementations, the display plate 110 and the license plate 120 can be mounted to the vehicle exterior V such that no overlap exists between the display plate 110 and the license plate 120. For example, the display plate 110 can be sized and mounted so that a bottom edge of the display plate 110 is adjacent and non-overlapping to a top edge of the license plate 120. Additionally, in some implementations, the display plate 110 can be thin enough so that the existing screws used to mount the existing license plate 120 to the vehicle exterior V, or similarly sized screws, can be used to mount the system 100. Furthermore, the display plate 110 can be thin enough to be mounted in a vehicle plate recess (not shown) of the vehicle exterior V between the license plate 120 and the vehicle exterior V without projecting away from the vehicle beyond the recess. In some embodiments, the display plate 110 can be thicker than the license plate 120.

In some embodiments, the display plate 110 has an outer housing that forms an encasement (not shown) so that, for example, the display plate 110 can house one or more of the components described herein. In some implementations, the display plate 110 and/or the license plate 120 are encased (at least partially) within a protective enclosure (not shown). The encasement and/or protective enclosure can be a rigid hard plastic or formed of a high impact plastic or polymer to protect the components of the display plate 110 and/or the license plate 120. Additionally, the encasement and/or protective enclosure can be waterproof and potted with an epoxy or other resin to prevent condensing humidity within the encasement and/or protective enclosure.

The encasement and/or protective enclosure can be sized based on the size of the display plate 110 and/or the license plate 120 in system 100. Typically, the encasement and/or protective enclosure will be sized based on the size of existing license plates in the intended jurisdiction of use. For example, the encasement and/or protective enclosure can be approximately 12 inches by 6 inches. Alternatively, the encasement and/or protective enclosure can have a length, height and/or a width that is greater than a length and/or a width of the license plate 120 and/or the display plate 110. Additionally, the encasement and/or protective enclosure can be clear at least in the area of the electronic display 112 so that the status indicator 114 can be viewed through the encasement and/or protective enclosure. The other sides of the encasement and/or protective enclosure can have any other suitable transparency. For example, in some embodiments, at least a portion of the encasement and/or protective enclosure is opaque to, for example, block the sun or elements of the surrounding environment to protect the electrical components housed within the encasement and/or protective enclosure.

The display plate 110 encasement and/or protective enclosure can define a hole or holes for vehicle mounting. The encasement and/or protective enclosure can be mountable by one or more fasteners, such as screws, to the license plate 120 and/or the vehicle exterior V. The encasement and/or protective enclosure can include any suitable number of holes and any suitable number of fasteners can be used. For example, the encasement and/or protective enclosure can include two or six holes and can be used with two or six fasteners, respectively. The display plate 110 encasement can be thin enough so that the existing screws used to mount the existing license plate 120 to the vehicle exterior V, or similarly sized screws, can be used to mount the rest of the system 100 including the encasement. Additionally, the display plate 110 encasement can be thin enough to be mounted in a vehicle plate recess (not shown) of the vehicle exterior V between the license plate 120 and the vehicle exterior V without projecting away from the vehicle beyond the recess. The protective enclosure can have any suitable thickness, width or height to house, or at least partially house the display plate 110 and the license plate 120.

As previously discussed, the electronic display 112 of the display plate 110 is configured to display a status indicator 114 of the vehicle and is therefore reconfigurable. The electronic display 112 can be bistable, meaning the electronic display 112 requires no power or voltage to maintain an image on the electronic display 112. Said another way, the electronic display 112 can use power only to change the image. The electronic display 112 can include or be constructed from, for example, electronic paper (i.e., e-paper), e-film, e-foil, and/or e-laminate. In some embodiments, the electronic display 112 is a liquid crystal display (LCD) or similar device. Using e-paper as part of an electronic license plate is described in U.S. Pat. No. 7,551,088 to Findlay, which is incorporated by reference herein in its entirety. The electronic display 112 can be thin, bendable, weather resistant, and/or durable to withstand environmental elements and normal "wear-and-tear" associated with outdoor vehicle use. Additionally, the electronic display 112 can be a single or multi-layered display and can also be configured to display low and/or high resolution graphics with no additional power consumption used to maintain the display. The electronic display 112 can be configured to display in black and white, grayscale, and/or color (i.e., one or more additional color than black and white). The grayscale can be, for example, greater than or equal to 4 bit. As will be discussed, the electronic display 112 can display one or more alphanumeric characters via the status indicator 114. Alternatively, the display plate 110 can include multiple electronic displays such that each electronic display displays a single alpha-numeric character. The alpha-numeric characters can be generated by a segmented bistable display containing, for example, between 100 and 200 segments. In some embodiments, the segmented bistable display can include more or fewer segments.

The electronic display 112 can be disposed within or on the display plate 110. The electronic display 112 can be configured to be any size that fits within the length and width of the display plate 110 or can be the same size as the display plate 110. For example, a display plate 110 that is 12 inches by 6 inches can include an electronic display that is also 12 inches by 6 inches. Alternatively, a display plate 110 that is 12 inches by 6 inches can include an electronic display that is smaller than 12 inches by 6 inches, such as, for example, 4 inches by 4 inches.

Although the electronic display 112 is shown schematically in FIG. 1 as being within the display plate 110, in some implementations the electronic display 112 can be configured as a component that is physically separate from and electrically coupled to other components of the display plate 110. In such implementations, the electronic display 112 can have a length and/or width that is larger or smaller than a length and/or width of the other components of the display plate 110. For example, the electronic display 112 can be attached via an adhesive to the back or front of the license plate 120. In such embodiments, the electronic display 112 can be similarly sized to the license plate 120, such as, for example, 12 inches by 6 inches. Alternatively, the electronic display 112 can be smaller than the license plate 120 and/or the other components of the display plate 110.

Additionally, although shown in FIG. 1 as having only one electronic display 112, the display plate 110 can include any number of electronic displays. For example, a seven-digit license plate identification number can be displayed by one electronic display, by two electronic displays, by seven electronic displays, or any suitable number of electronic displays. See, for example, FIGS. 4B-4D.

As previously discussed, the electronic display 112 displays vehicle-related information via a status indicator 114. At any given time, the status indicator 114 can indicate a type of license plate (e.g., university, special interest, government), display a license plate identification number, a renewal image, a suspension image, a revoked image, a stolen image, an AMBER Alert, parking authorization information, toll information, access control information, public alerts, or any other image or message. The status indicator 114 can be changed at any time to any other image or message based on various factors and/or information received from, for example, government-affiliated authorities. Additionally, the electronic display 112 can display status information received from the vehicle. For example, the electronic display 112 can display an emergency status when the hazard lights of the vehicle are activated. In some implementations, the electronic display 112 can display status information received from a wireless communication device, such as a smartphone, of the vehicle's driver. For example, the electronic display 112 can display a request for a tow truck. Although shown in FIG. 1 as including only one status indicator 114, the electronic display 112 can include any number of status indicators.

The electronic display 112 can be populated with, for example, the numbers one through twelve. The numbers one through twelve can represent, for example, the month of the current year to show the vehicle is in compliance. The electronic display 112 can be configured to display the license plate identification number when the vehicle registration is not expired and to display dashes when the vehicle registration is expired. The electronic display 112 can also be populated with, for example, the letter U or I to indicate the vehicle is uninsured or insured, respectively. To represent other conditions, as examples, the letter S can be displayed to indicate the vehicle is stolen, the letter A can be displayed to indicate the vehicle is part of an AMBER Alert (see, e.g., FIG. 5D), the letter F can be display to indicate the vehicle is part of a Federal Emergency Management Agency (FEMA) event, and the letter P can be displayed to indicate that the public should contact law enforcement about the vehicle.

Although the license plate 120 is shown as defining only one aperture 122, the license plate 120 can define any suitable number of apertures so that any amount of information can be displayed. In some embodiments, the license plate 120 can define an aperture 122 for each status indicator 114 and/or each electronic display 112 included in the display plate 110 so that each status indicator 114 and/or electronic display 112 can be viewable through a corresponding aperture 122.

The system 100 can include one or more permanent images and/or constructions. For example, the license plate 120 can include a painted metal surface displaying a permanent image.

The permanent image can be, for example, a state name, a state website, and/or other information and/or graphics approved by the state. The one or more apertures 122 can be formed in a separate portion of the license plate 120 from the permanent images and/or constructions. In some embodiments, visible portions of the display plate 110 can also include one or more permanent images as an alternative or in addition to any permanent images on the license plate 120. In some embodiments, the permanent images can be the license plate identification number (e.g., license plate identification number 428 shown in FIG. 5A).

Additionally, the electronic display 112 can display virtually any image. The display plate 110 can change all or only a portion of the image on the electronic display 112. For example, in some embodiments, the electronic display 112 can include background graphics that can be changed while a displayed identification number, e.g. a license plate number issued by a state or country, is maintained.

The electronic display 112 can be remotely changed by a managing authority so that the status of the system 100 can be visually identifiable to law enforcement and/or the public. The managing authority can be a state, issuing authority, motor vehicle agency, governing entity, government contractor, or any other organization implementing an electronic vehicle plate (EVT) system. The EVT system can contain a secure server and a database that uniquely identifies one or more display plates 110 and contains information about the compliance of one or more display plates 110. Additionally, law enforcement and other designated officials can be provided access to the EVT system to send alerts to particular systems 100 and to collect information gathered by particular systems 100. The information gathered can be collected via a variety of sensors and include, for example, location data and/or shock or tilt sensor data. Compliance information can be compiled by the secure server by connection to other servers and databases to aggregate compliance status. Accordingly, the system 100 can be used in conjunction with an electronic vehicle plate (EVT) system to identify an associated vehicle and enforce the laws of managing authorities who choose to implement the system 100 for the purpose of motor vehicle and law enforcement, as well as other display purposes.

Because the electronic display 112 uses no power consumption to maintain an image, the display plate 110 can rely on a battery (not shown) to power the display plate 110. As a result, the display plate 110 can be electrically independent of a vehicle to which the system 100 is mounted. Said another way, the display plate 110 can be configured with no electrical connection to the vehicle to which is it mechanically mounted, and the display plate 110 may not rely on any computing, power, and/or communications resources of the vehicle. Because no power is needed from the battery to maintain the image, the battery can have a long life expectancy. For example, the battery can last for five years or more.

The lack of electrical connection between the display plate 110 and the vehicle has the benefit of requiring no significant alteration of the vehicle for the installation of the system 100. For example, the vehicle does not need to be retrofitted to power the display plate 110. Said another way, the vehicle does not need to be rewired and no additional holes need to be drilled into the exterior or interior of the vehicle. In some embodiments, the display plate 110 can be mounted to the vehicle using the vehicle's existing license plate screws. Additionally, the lack of electrical connection between the display plate 110 and the vehicle's computing, power, and/or communication resources reduces potential security concerns relating to the display plate 110 potentially having access to vehicle information that the vehicle's user is not required to furnish to the managing authority and would prefer to keep private. For example, the display plate 110 would not have access to the addresses of a user's contacts that may be maintained by the vehicle's computer system. Furthermore, by separating the display plate 110 (and system 100) from the vehicle's internal power system, the display plate 110 (and system 100) can still be operable and function when, for example, the vehicle's battery is dead or power within the vehicle is low.

As described above, the license plate 120 can include the existing license plate of the vehicle to be used as part of the system 100. The existing license plate 120 can be altered under the instruction and/or approval of the managing authority. The managing authority can use a specific tool or machine to punch out or cut out apertures 122 in the license plate 120 according to the particular electronic display 112 needs. Alternatively, the managing authority can designate qualified service professionals such as mechanics at vehicle inspection stations to perform the license plate 120 alterations. The existing license plate 120 can be aligned in or with the tool and a handle can be pulled down to punch the one or more apertures out of the license plate 120. The use of the existing vehicle license plate eases the transition from a non-electronic vehicle plate system to the use of system 100. The reuse of the existing license plates can save environmental and economic resources because the license plates have already been manufactured and do not need to be replaced. Additionally, the reuse of the existing license plates can maintain improved security with regards to particular information displayed by the system 100. For example, the managing authority may have an increased interest in the license plate identification number being secure and difficult to alter, and therefore may prefer that the license plate identification number be displayed on the existing license plate rather than on an electronic display. There may be reduced security concerns if the license plate identification number is printed on the license plate 120 because information printed on the license plate 120 is not vulnerable to an electronic security breach.

In some embodiments, the portion of the display plate 110 to which the electronic display 112 (e.g., electronic paper) is mounted can be recessed to protect the electronic display 112 from any sharp or jagged edges that may surround the aperture 122 of the license plate 120 as a result of the process of producing the aperture 122. The recessed portions can also prevent damage to the electronic display 112 that may result from friction and/or vibrations that may occur between the electronic display 112 and the license plate 120 as a result of normal use of the vehicle. Alternatively or additionally, a collar (not shown) can be affixed to the license plate 120 or the display plate 110 in a location that at least partially surrounds the aperture 122 to prevent potentially damaging contact between the portions of the license plate 120 surrounding the aperture 122 and the electronic display 112. The collar can be made of foam or any suitable material. The collar can be affixed to the license plate 120 or the display plate 110 via adhesive or any other suitable method. The display plate 110 can include any number of recesses corresponding to any number of apertures of the license plate 120.

The managing authority can register a vehicle using system 100 by implementing procedures from an existing registration system. Alternatively, the managing authority can use other methods of registration. The managing authority can then assign the appropriate information to the individual vehicle. For example, the managing authority can assign the requested registration type of license plate to the vehicle. For example, a university plate, a special interest plate, and a government plate can each have an associated identifying symbol that the display plate 110 can display on the electronic display 120. The managing authority can then send the requested plate type information to an electronic vehicle plate (EVT) system. The EVT system can then send a wireless signal containing the information relating to the requested plate type to the display plate 110. The display plate 110 can display the requested plate type with any corresponding information and/or an identifying symbol. The managing authority can also send the display plate 110 a renewal image, a suspension image, a revoked image or any type of display image required. Therefore, the EVT system, in combination with the system 100, can allow the managing authority to provide substantially instant compliance status notification updates displayed on the electronic display 112 of system 100. Law enforcement can also be granted authorization to send any type of image or message they request. The EVT system can allow law enforcement to substantially instantly send any type of warning message or image to a system 100 regardless of vehicle location. For example, the system 100 can indicate if the vehicle has been stolen or is related to an AMBER Alert. In an emergency situation, such as the AMBER alert, law enforcement or other managing authorities can send a signal to the system 100 to change the status indicator 114 to read "A" within hours, minutes or even seconds of a report being filed. In non-emergency situations, the EVT system can be programmed to send a signal, for example, once a day at a pre-determined time (e.g., at midnight) to all systems 100 that involve changes to their respective status indicator 114. A non-emergency situation would be when a vehicle's registration becomes expired.

In some embodiments, the system 100 (or any component thereof) can be implemented as a decal or sticker. For example, the electronic display 110 can have a secure adhesive coating on its back that is protected by a cover. This cover can then be peeled off to reveal the secure adhesive coating. In this manner, the electronic display 110 can be applied directly onto the exterior surface of the vehicle V or to the outward facing surface of the license plate similar to a decal or sticker. For example, the system 100 can be implemented as an International Fuel Tax Agreement annual decal, which is used by all jurisdictions and Canadian Provinces.

The system 100 can contain a passive, battery-assisted, or active RFID tag (not shown). The RFID tag can be used by law enforcement for standoff identification of the vehicle or verification of an authentic system 100. The RFID tag can also be used to replace existing toll RFID tags such as E-ZPass®. The RFID tag can also be programmed for use in access control applications such as parking garages and gated communities. The RFID tag can be attached to the license plate 120 or the display plate 110 via, for example, an adhesive.

The system 100 can also contain a shock or tilt sensor (not shown) to detect an impact or overturned vehicle. The system 100 can be configured to automatically alert law enforcement and/or first responders when the shock or tilt sensor is activated above a threshold.

The visible portions of the system 100 can be coated with a retroreflective coating, such as those available from 3M®, to direct light incident on the system 100 back toward the source of light. In particular, the electronic display 114 and any permanent images can be coated with the reflective coating. The reflective coating can enable the system 100 to be visible at greater distance. Alternatively or in addition to the reflective coating, the one or more displays can include one or more light pipes (not shown) for capturing light from the edges of the system 100 that may be supplied by any license plate lights of the vehicle. The light pipes can direct the light to the system 100 to illuminate the electronic display 114, any color block displays, and any permanent images. The light pipes can also allow visibility at greater distance. In some embodiments, the visible portions of the system 100 can also be coated with a display protective coating to protect the portions of the system, particularly the electronic display 112, from damage from, for example, dirt or sunlight.

The system 100 can include a front light (not shown). The front light can be located on the display plate 110 or on the license plate 120. The front light can illuminate the system 100 at any time including, but not limited to, a non-compliance event. For example, if the electronic display 112 indicates that the vehicle is stolen, the front light can be configured to illuminate to draw more attention to the stolen vehicle. The front light can continuously illuminate the system 100 or can blink the illumination for increased attention. The front light can be powered solely from energy harvested by an energy harvester module (such as energy harvest module 217 described below) to ensure the battery will last the expected lifetime.

In some embodiments, the display plate 110 can include one or more color film displays (not shown). The color film displays can include a portion of the display plate 110 that is at least partially covered by a color film (not shown) to provide at least one color to the display plate 110. The film can be electronically or mechanically controllable via a microcontroller and/or cellular communication. As an example, the film can be a color filter. The film can be used over the electronic display 112 or on a standalone basis. The film can be implemented as a roll of film where the roll contains numerous colors. The film color can be changed by mechanically rolling the film using one or more rollers and one or more motors, such as, for example, a stepper motor. The film can be printed or made from solid color material. The colors can be vibrant and include a reflective coating or additive.

In some embodiments, the license plate 120 can also include at least one aperture for viewing of the one or more color film displays. In some embodiments, for example, the license plate 120 can include a first aperture for displaying the electronic display 112 including e-paper and a second aperture for displaying a color film display as described above.

FIG. 3 is a schematic illustration of an electronic vehicle plate 200 according to an embodiment. The electronic vehicle plate 200 includes a display plate 210 having an electronic display 212. The electronic display 212 can be any type of apparatus capable of displaying an image, including, for example, electronic paper (i.e., e-paper), e-film, e-foil, and/or e-laminate. The electronic display 212 can function similar to or include any of the features of the electronic display 112 described above with reference to FIGS. 1 and 2. Similarly, the display plate 210 can function similar to or include any of the features of the display plate 110 described above with reference to FIGS. 1 and 2.

As shown in FIG. 3, the display plate 210 can include a logic board 216, an antenna 213, a battery 211, a global positioning system (GPS) module 215 and an energy harvester module 217. The logic board 216 can provide the display plate 210 with a central processing unit (not shown), which can include a circuit board, microprocessor, transceiver, and/or memory storage. The central processing unit can also include a power management circuit and a display driver. The logic board 216 can process security authentication of any signal received over a wireless network and manage the manipulation of the electronic display 212.

The antenna 213 can be connected to a transceiver (not shown) of the logic board 216, and used to manage communications between the managing authority and the logic board 216. The communications can be via cellular, WiFi®, Bluetooth®, satellite, and/or other wireless networks. The antenna 213 can be assigned a specific addressable key (i.e., a unique identifying key). The antenna 213 can be configured to use power from the battery 211 only in the event the antenna 213 receives the specific addressable key via a signal from the managing authority. Once the specific addressable key has been received, the antenna 213 can pass on the corresponding signal to the logic board 216 for authentication of the signal and processing of image manipulation data/instructions represented within or triggered by the signal. Once the logic board 216 has carried out the specified actions represented or instructed by the signal, the antenna 213 can optionally send a signal indicative of a successful change of the electronic display 212 to the managing authority via wireless communications.

The unique identifying key allows the antenna 213 to communicate with and be identified within the signal carrier. In other words, the unique identifying key can enable the display plate 210 to be identified and addressed by a wireless network. The unique identifying key also serves as a security measure to ensure only the managing authority may identify and address the display plate 210. This can be similar to a media access control (MAC) address assigned to each network card within a computer network. The display plate 210, once identified, can be addressed anywhere in a given associated carrier network with sufficient bandwidth to complete the communication. In some implementations, using existing cellular technologies, the display plate 210 can be configured to be addressed anywhere within range of cell phone communication. With the current infrastructure within the United States, the display plate 210 could be available for communication substantially anywhere within the continental United States.

In some implementations, the display plate 210 may contain two or more radio devices for redundant communication options. As an example, the display plate 210 can include a cellular or mobile network modem (not shown)

and a WiFi® connection (not shown). Implementations including a cellular or mobile network modem will likely use significant power from the battery 211. For this implementation, a power harvester could be included to help power the display plate 210, as discussed below. The WiFi® connection can be designed to connect over any open WiFi® network to receive updates and can disable the cellular connection of the antenna 213 for a predetermined time period when a WiFi® connection and update is achieved to save battery capacity in battery 211. Additionally or alternatively, in some embodiments, the display plate 210 can include a Bluetooth® radio. The Bluetooth® radio can be used by the display plate 210 to connect to a secure server to obtain compliance information via a driver's, passenger's, or other person's cellular or mobile phone. This connection can be automatically performed without user interaction. Alternatively, an application on a cellular or mobile phone can prompt the user to allow the connection. The Bluetooth® radio may also be used by the user to configure the operation of the display plate 210. As an example, an application may have the ability to communicate with the display plate 210 via the user's smartphone. The application can then securely connect to the secure server to obtain compliance information. The compliance information can then be sent from the user's smartphone to the display plate 210 via Bluetooth®. This type of connection allows the user to maintain compliance and proper images/information on the display plate 210 if a cellular connection is not available. The Bluetooth® connection and application can also be used to setup one or more WiFi® connections for the display plate 210 to connect. In some embodiments, the display plate 210 can wirelessly communicate with a WiFi® and/or cellular connection that can exist in the vehicle such as via an access point within the vehicle.

The energy harvester module 217 can be configured to augment or recharge the battery 211. In some implementations, the energy harvester module 217 can capture vibration energy while the vehicle to which the display plate 210 is mounted is in motion. Alternatively or additionally, in some implementations, the energy harvest module 217 can capture solar energy using a solar cell. The battery 211 can provide power to the electronic display 212, as indicated by flow line 206, and to the logic board, as indicated by flow line 207. As indicated by connection 208, the energy harvested by the energy harvester module 217 can be used to recharge the battery 211. Additionally, the energy harvester module 217 can provide power to the electronic display 212 and the logic board 216 directly, as indicated by connections 209 and 205, respectively. In some embodiments, the battery 211 can be a primary battery and the display plate 210 can include a supercapacitor (not shown). The battery 211 can used to power the display plate 210 during non-harvesting periods and the supercapacitor can be used to power the display plate 210 when sufficient harvested energy is available. The supercapacitor can also be used to provide large peak currents that can be used during display updates or radio transmissions. In some embodiments, the display plate 210 can include a second battery (not shown) and the energy harvester module 217 can be configured to recharge the second battery.

The GPS module 215 can track the location, speed, and mileage of a vehicle to which the display plate 210 is mounted. The GPS module 215 can be powered by the battery 211 and/or the energy harvester module 217. The GPS module 215 can transmit data relating to, for example, the location, speed, and/or mileage of the vehicle via the antenna 213. The GPS module 215 can be used by law enforcement to identify the location of the vehicle, for example, in the event that the vehicle is stolen.

In some embodiments, the display plate 210 can include a buzzer (not shown), speaker (not shown), or other sound generating device (not shown) to send audio alerts to police authorities. The buzzer, speaker, or other sound generating device can be under the control of the logic board 216 and can be powered by the battery 211 and/or the energy harvester module 217. In the case of an emergency event, such as a stolen vehicle, the buzzer, speaker, or other sound generating device can output sound indicating that the emergency event is occurring. In some embodiments, the display plate 210 can include a camera configured to collect images related to the vehicle's surroundings. These images can be stored in the memory of the logic board 216 or transmitted via the antenna 213 to the managing authority or law enforcement. For example, if the vehicle is reported stolen, law enforcement can review the images to gather information related to the vehicle's location. The camera can be powered by the battery 211 and/or the energy harvester module 217.

In some embodiments, the display plate 210 can include a tamper sensing mechanism (not shown) to determine if a user is trying to affect the operation of the display plate 210. The tamper sensing mechanism can detect if a user is attempting to disable or remove the display plate 210. The display plate 210 can send an alert to the managing authority or law enforcement if tampering is detected. The tamper sensing mechanism can transmit data relating to a tampering condition via the antenna 213. The tamper sensing mechanism can be powered by the battery 211 and/or the energy harvester module 217. In an alternative implementation, the system 200 can send a beacon to, for example, the managing authority. If the beacon is not received, the managing authority can determine that tampering or a system failure has occurred. The beacon can be scheduled to be sent by the system 200 at particular times and/or time intervals (e.g., once per day, once per week, etc).

In some embodiments, the display plate 210 can include a user input mechanism (not shown). The user input mechanism can be coupled to the logic board 216 and can include a keypad, fingerprint sensor, or other input mechanism. The user input mechanism can be used by the user to configure the display plate 210 or to manually input data used to maintain compliance information on the display plate 210. As an example, the display plate 210 may contain a keypad. If the user is in an area without cellular coverage, the user may want to call a phone number and obtain a number, letter, or alpha-numeric key to enter using the keypad. The number, letter, or alpha-numeric key can be entered to reset or maintain the compliance information on the display plate 210. Each display plate 210 can be assigned a secure unique list of keys that are entered to gain access.

In some embodiments, the display plate 210 can default to an unknown or default state if the display plate 210 loses communication with the secure server for a predefined time period such as, for example, one week or one month. The unknown or default state would not indicate non-compliance but rather that the display plate 210 has lost communication ability due to geographic location, malfunction, or damage. The user may use a manual interface to clear the unknown or default state using information obtained via a phone call to the managing authority, via the managing authority's compliance smartphone application, or another method. The user may also use the managing authority's smartphone application to automatically clear the unknown or default state via a Bluetooth® or other wireless connection to the display plate 210.

In some embodiments, the display plate 210 can include a temperature sensor. The temperature sensor can be used to adjust the operation of the display plate 210. As an example, the display plate 210 display may involve a longer time to update during cold temperatures. The display plate 210 can adjust the drive voltages and timings based on the temperature provided by the temperature sensor. Additionally, the temperature data may be provided to the secure server and used for other purposes. The temperature sensor can be powered by the battery 211 and/or the energy harvester module 217.

FIG. 4A is an illustration of a license plate 320 to be used in a system 300 according to an embodiment. Similarly as described with reference to license plate 120 described above, the license plate 320 can be an existing license plate on a vehicle before the installation of the system 300. The license plate 320 can include one or more permanent images 324 displaying a state name and a state website, as shown. In some embodiments, the license plate 320 can include other information and/or graphics approved by the managing authority. The license plate 320 also includes printed license identification numbers 326 in an initial configuration. The license identification numbers 326 can be printed on the license plate 320 with reflective paint.

FIG. 4B is an illustration of the license plate 320 in a configuration with defined apertures 322. The apertures 322 can be produced so that the printed license identification numbers 326 are removed from the license plate 320. The apertures 322 can be produced by aligning the license plate 320 with a tool or machine that includes a handle configured to mechanically operate a punching or cutting element. The handle can be pulled down to punch or cut the one or more apertures out of the license plate 320. As described above with reference to the system 100, this procedure can be performed by the managing authority or a designated qualified service professional. The apertures 322 can be pre-manufactured or post-manufactured.

FIG. 4C is an illustration of the system 300 in a configuration where the license plate 320 is attached to a display plate. The display plate can be similar in structure and function to the display plates 110 and 210 described above. The display plate includes an electronic display 312, which can be configured to display a status indicator. Alternatively, the electronic display 312 can be attached directly to the license plate 320. The electronic display 312 can be attached to the back or to the front of the license plate 320 via, for example, an adhesive. The electronic display 312 can be similar in structure and function to the electronic displays 112 and 212 described above. As shown in FIG. 4C, the electronic display 312 can be configured to display a license plate identification number when the vehicle registration is not expired.

FIG. 4D is an illustration of the system 300 in a configuration where the license plate 320 is attached to the display plate and the electronic display 312 indicates non-compliance. If the system 300 receives a signal from the managing authority indicating, for example, that the vehicle registration is expired, then the electronic display 312 can be configured to display dashes through the apertures 322 of the license plate 320, as shown in FIG. 4D.

In an alternative implementation, rather than remove portions of the existing license plate 320, the electronic display 312 can be attached to the front of the existing license plate 320 and cover the printed license identification numbers 326. For example, the one or more of the seven alpha-numeric characters of the license plate identification number of FIG. 4A can be replaced by a separate electronic display. The one or more electronic displays 312 can be attached to the front of the license plate 320 via, for example, adhesive, and can be similar in structure and functions to the electronic displays 112 and 212 describe above. For example, the one or more electronic displays 312 can include electronic paper. The electronic display 312 can be formed as patches that can be flexible or rigid. The electronic display 312 can be configured to replace any existing identification stickers on the license plate 320.

FIG. 5A is an exploded perspective view of an electronic vehicle plate system 400 according to an embodiment. The system 400 includes a display plate 410 and a license plate 420. The display plate 410 includes four holes 432 and the license plate 420 includes four holes 421 for mounting the display plate 410 and the license plate 420 to a vehicle. The system 400 includes four screws 402 configured to engage with the display plate holes 432 and the license plate holes 421 to mount securely the display plate 410 and the license plate 420 to the vehicle exterior V. Although shown as including four screws 402 and four holes in each of the display plate 410 and the license plate 420, the system 400 can include any suitable number of screws and corresponding holes to mount the system. Additionally, although shown as screws, the system 400 can include any suitable type of fastener.

The license plate 420 includes a license plate identification number 428 painted on the front of the license plate 420 and an electronic display 412 displaying a status indicator 414. The license plate 410 also includes one or more permanent images 424 displaying a state name and a state website, as shown. The license plate 420 defines an aperture 422 such that at least a portion of the electronic display 412 is visible through the aperture 422 when the system is mounted to a vehicle exterior V.

The display plate 410 and the electronic display 412 are similar in structure and function to the display plates 110, 210 and the electronic displays 112, 212 described above and will not be further described herein.

FIG. 5B is a perspective view illustration of the electronic vehicle plate system 400 in a first configuration. In the first configuration, when the license plate 420 is mounted to the vehicle exterior V, at least a portion of the electronic display 412 is visible through the aperture 422 in the license plate 420. In particular, the status indicator 414 is visible through the aperture 422 in the license plate 420. As shown in FIG. 5B, although the display plate 410 is sized to have a similar length and width to the license plate 120, the display plate 410 has a slightly longer width in the area of the antenna 413. As a result, cellular, other antennas, and/or other components can protrude from underneath the license plate 420, ensuring that the antenna within the display plate 410 will send and receive signals more effectively.

Figure 5C:
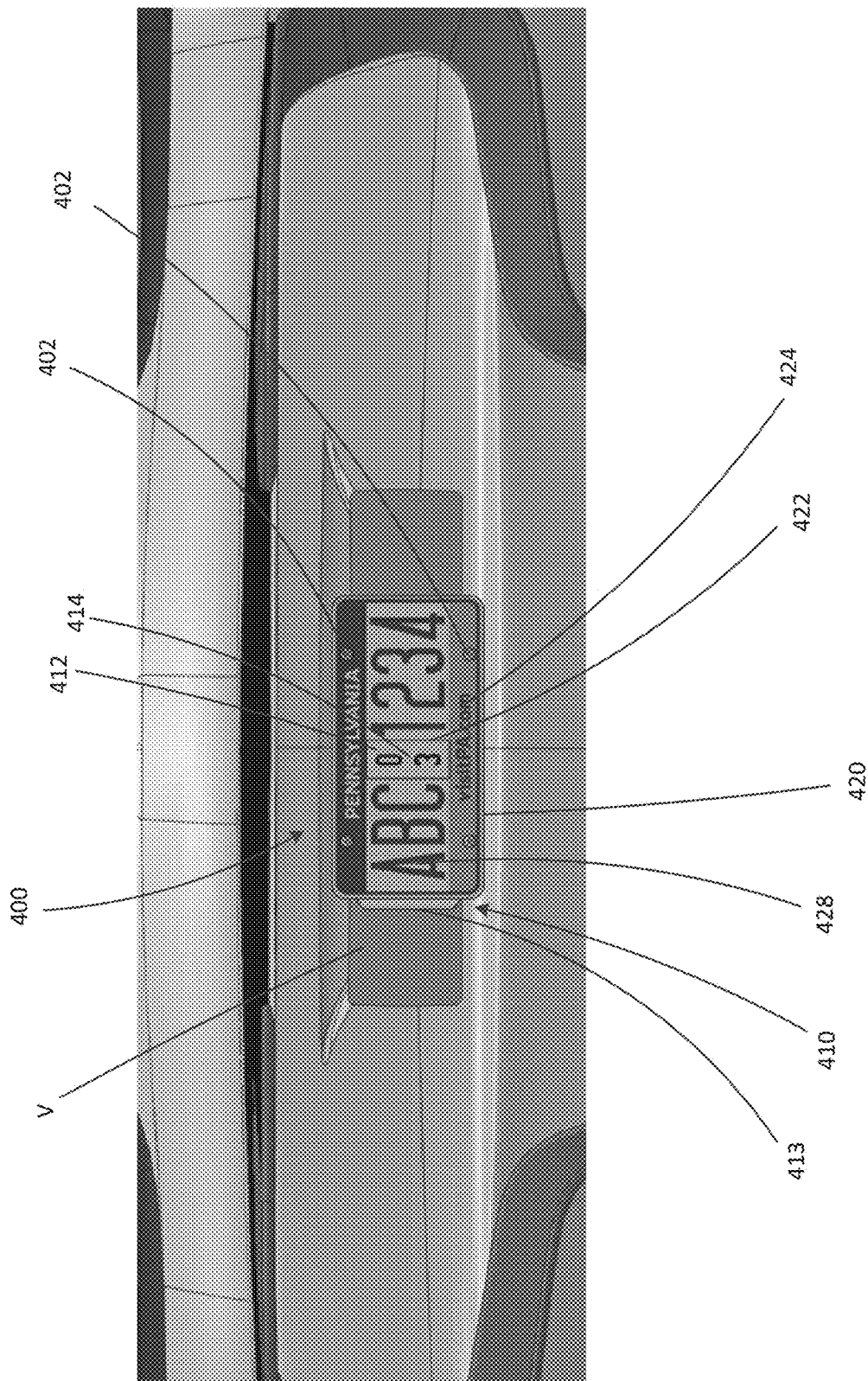
FIG. 5C is a front view illustration of the electronic vehicle plate system of FIG. 5A in a second configuration according to an embodiment.

FIG. 5C is a front view illustration of the electronic vehicle plate system 400 in a second configuration where the system 400 displays numbers to indicate, for example, that the vehicle registration is in compliance. As can be seen in FIG. 5C, the electronic display 412 is displaying the status indicator 414 as "03" in a vertical orientation. This status indicator 414 can indicate that the vehicle is in compliance until the third month of the current year. Alternatively, this status indicator 414 can indicate that the current date falls within the third month of the current year, signaling to the managing authority and/or law enforcement that the system 400 remains in compliance. The electronic display 412 can be populated with the numbers one through twelve to indicate to which of the twelve months the vehicle will be in compliance/during which the vehicle is currently in compliance. It should be understood from the disclosure herein that the electronic display 412 can have any combination of letters, numbers or characters sufficient to demonstrate that the vehicle is compliant or non-compliant. For example, the electronic display 412 can include the letter "M" in addition to "03", which could indicate that the vehicle is compliant through the third day of May or even the third week of May. The electronic display 412 can be update and display monthly, weekly or daily compliancy information. As such, the system 100 provides the most up-to-date vehicle compliancy information.

Figure 5D:
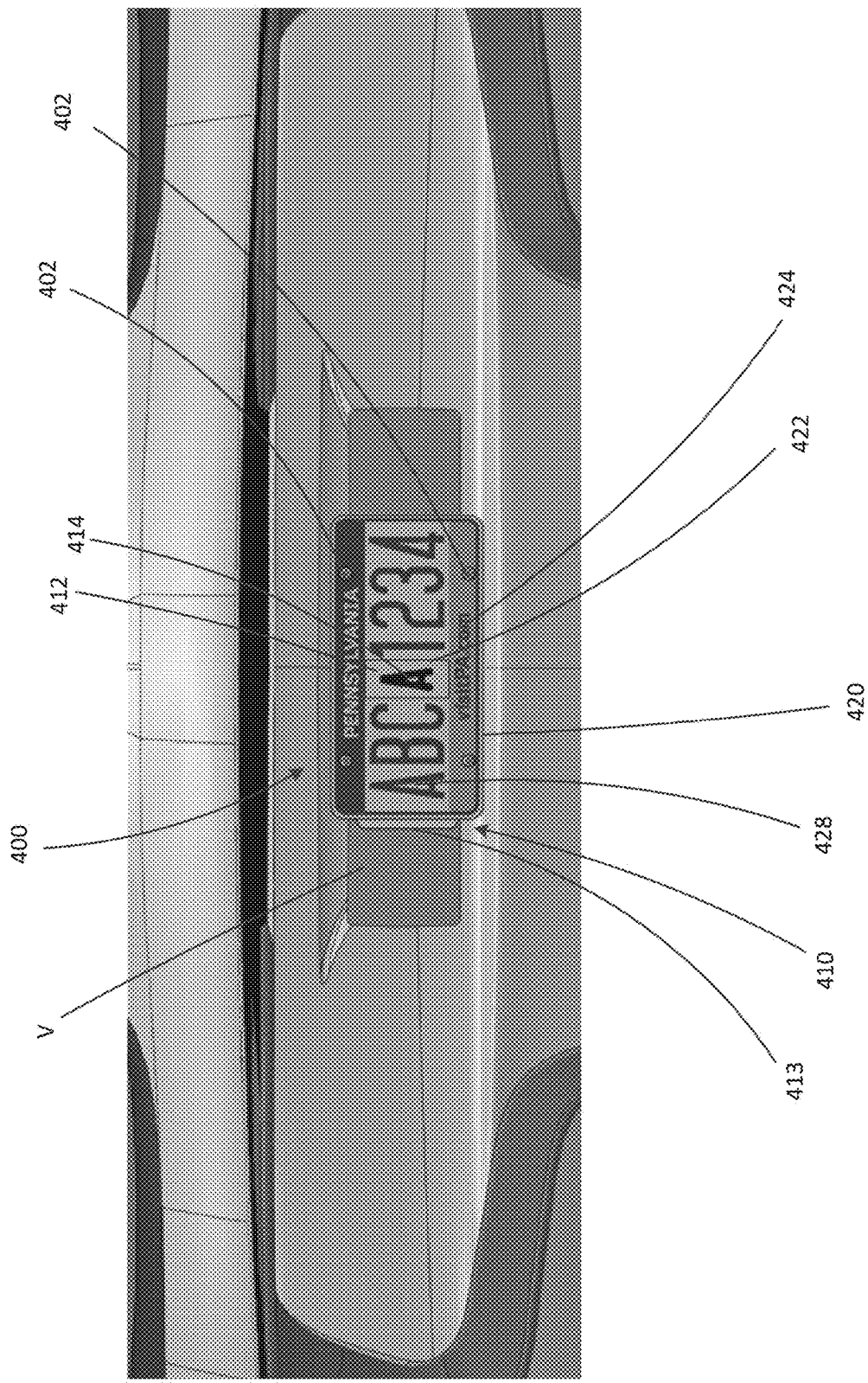
FIG. 5D is a front view illustration of the electronic vehicle plate system of FIG. 5A in a third configuration according to an embodiment.

FIG. 5D is a front view illustration of the electronic vehicle plate system 400 in a third configuration where the system 400 displays a letter of the alphabet to indicate, for example, that the vehicle is related to an AMBER Alert. As can be seen in FIG. 5D, the electronic display 412 is display the status indicator 414 as "A". This status indicator 414 can indicate that law enforcement is seeking the vehicle in connection with resolving the AMBER Alert. As a result, the public can help to identify the location of the vehicle. In other configurations, similarly as described with reference to system 100, the electronic display 412 can be populated with, for example, the letter U or I to indicate the vehicle is uninsured or insured, respectively. To represent other conditions, as examples, the letter S can be displayed to indicate the vehicle is stolen, the letter F can be display to indicate the vehicle is part of a FEMA event, and the letter P can be displayed to indicate that the public should contact law enforcement about the vehicle. Any suitable pre-determined letter or set of letters and/or numbers can be displayed using the system 400 to alert the public or law enforcement officials of an emergency, event, or non-compliance.

FIG. 6 is a flow chart of a method 500 of operating a display plate, such as the display plate 110 shown in FIG. 1, according to an embodiment. Method 500 includes displaying a first status indicator of a vehicle on a display plate mounted to the vehicle, at 502. The first status indicator can be similar to the status indicator 114 shown in FIG. 1. The displaying the first status indicator of the vehicle can include displaying the first status indicator of the vehicle on the display plate during a time period without using power. The display plate is coupled to a license plate having an aperture and the first status indicator of the vehicle displayed on the display plate is visible through the aperture of the license plate, similar to the arrangement of the system 100 shown in FIG. 2. A signal from a remote server is received at an antenna of the display plate, at 504. The antenna can be similar to the antenna 213 shown in FIG. 3. The signal indicates a change from the first status indicator of the vehicle to a second status indicator of the vehicle. A transceiver coupled to the antenna of the display plate can use energy from a battery electrically isolated from the vehicle to receive the signal, such as the battery 211 shown in FIG. 3. The transceiver can extract instructions from the received signal and send a signal to the electronic display. In response to the receiving, the second status indicator of the vehicle is displayed on the display plate, at 506, such that the second status indicator of the vehicle is visible through the cutout of the license plate.

In some embodiments, the signal can be a first signal, and a second signal can be transmitted from the antenna of the display plate to a server remote from the vehicle. The second signal can indicate a request for updated status information associated with the vehicle. The transmitting of the second signal can occur before the receiving of the first signal. The transceiver of the display plate can use energy from the battery electrically isolated from the vehicle to transmit the second signal via the antenna.

The first status indicator of the vehicle can indicate that the vehicle is compliant with vehicle regulations (e.g., the status indicator displayed by electronic display 314 as shown in FIG. 4C). The second status indicator of the vehicle can indicate that the vehicle is non-compliant with the vehicle regulations (e.g., the status indicator displayed by electronic display 314 as shown in FIG. 4D). Alternatively, the first status indicator of the vehicle can indicate that the vehicle is non-compliant with vehicle regulations and the second status indicator of the vehicle can indicate that the vehicle is compliant with the vehicle regulations. The first status indicator can be any of the images, letters and/or numbers described above, and can be changed to any other of the images, letters and/or numbers for any of the reasons described above.

Figure 7A:
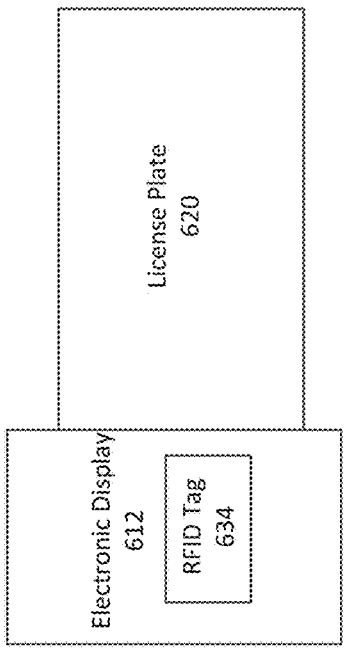
FIGS. 7A-7D are schematic illustrations of an electronic vehicle plate system according to an embodiment.
Figure 7B:
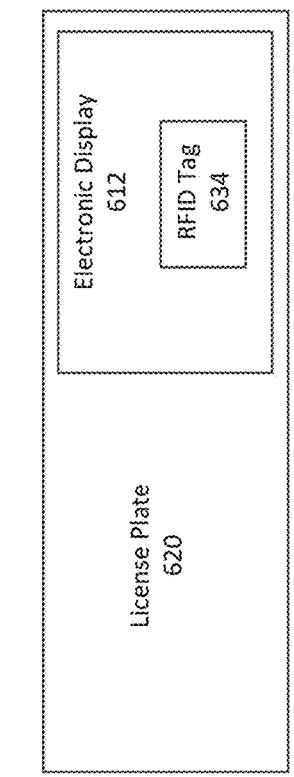
Figure 7C:
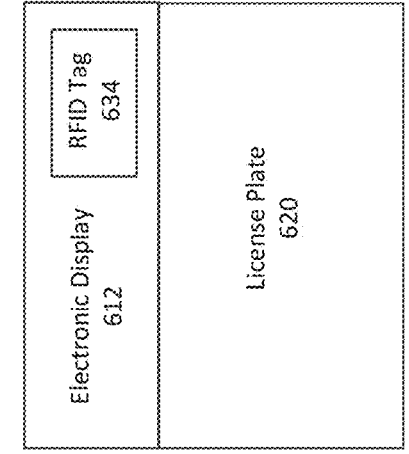
Figure 7D:
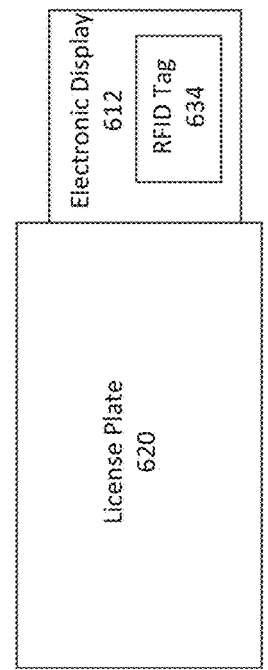

FIGS. 7A-7D are schematic illustrations of various configurations of an electronic display 612 and the license plate 620 in a system 600. The electronic display 612 can be similar in structure and function to the electronic display 112, or any of the electronic displays described above, and will not be further described herein. The license plate 620 can be similar in structure and function to the license plate 120, or any of the electronic displays described above, and will not be further described herein. As shown in FIGS. 7A-7D, the electronic display 612 and the license plate 620 can be arranged relative to each other in a variety of configurations. FIG. 7A shows a configuration where the electronic display 612 is attached to the front face of the license plate 620. FIG. 7B shows a configuration where the electronic display 612 is attached to the right edge of the license plate 620. FIG. 7C shows a configuration where the electronic display 612 is attached to the left edge of the license plate 620. FIG. 7D shows a configuration where the electronic display 612 is attached to the top of the license plate 620. Additionally, as shown in FIGS. 7A-7C, the electronic display 612 can be shaped and sized so that it has the same or different length and/or width as a length and/or width the license plate 620. Although not shown, the electronic display 612 can be shaped and sized to attach to the license plate 620 in other configurations, such as across the bottom or attached to the bottom of the license plate 620.

Additionally, as shown in FIGS. 7A-7D, the system 600 can contain a passive, battery-assisted, or active RFID tag 634. The RFID tag 634 can be used by law enforcement for standoff identification of an associated vehicle or verification of an authentic system 600. The RFID tag 634 can also be used to replace existing toll RFID tags such as E-ZPass®. The RFID tag 634 can also be programmed for use in access control applications such as parking garages and gated communities. The RFID tag 634 can be attached to the license plate 620 or a display plate of the system 600 via, for example, an adhesive. Specifically, the RFID tag 634 can be attached to the system 600 so that it is adjacent to the electronic display 612 when the electronic display 612 is mounted on a vehicle. The RFID tag can be configured to send an electrical signal representing identification information of the vehicle.

In some embodiments, a vehicle can include more than one of the systems disclosed herein. For example, certain jurisdictions require two license plates—one displayed at the front of the vehicle and one displayed at the rear of the vehicle. In these jurisdictions, the vehicle can include two cooperatively functioning EVT systems. In some embodiments, the EVT systems have the same functionality except that one of the EVT systems functions as a slave to the other EVT system. The master EVT system can be capable, for example, of communicating over a cellular network while the slave EVT system communicates directly with the master EVT and is restricted from such long-range communications. In other embodiments, however, the two or more EVT system have the same communication functionality and components.

In some embodiments, as an alternative to the embodiments described above, any of the display plates described herein can be configured to be electrically connected to a vehicle's electrical system and/or wiring. For example, a display plate can be connected to vehicle power, a vehicle communication system, the vehicle's computer, or other electrical system. As a result, the managing authority can have access to and/or control of a system of the vehicle. For example, if a vehicle is reported stolen, the managing authority can control the display plate 110 of the system 100 to connect to the vehicle's computer and disable the vehicle.

In some embodiments, any of the display plates 110, 210, 310, or 410 described herein can include a printed front that contains the information typically found on the license plate 120 described above. For example, the license plate identification number can be printed directly on the display plate. In this embodiment, the display plate can fully replace the existing license plate and no license plate is needed as part of the system.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented in a way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components form any of the embodiments as discussed above.

The invention claimed is:

1. An apparatus, comprising:
a display plate disposed between a license plate and an exterior of a vehicle when the license plate is mounted to the exterior of the vehicle, wherein the license plate comprises a solid portion upon which is printed a vehicle identification indicia;
an electronic display coupled to the display plate such that at least a portion of the electronic display is visible through an aperture in the license plate when the license plate is mounted to the exterior of the vehicle, wherein the aperture is offset from the vehicle identification indicia and wherein the electronic display is configured to display a first status indicator and a second status indicator of the vehicle through the aperture in the license plate;
an antenna; and
a transceiver coupled to the antenna and to a battery electrically isolated from the vehicle for providing energy to the transceiver for operation thereof, wherein the transceiver is configured to
receive from the antenna a first signal from a remote server indicating a change from the first status indicator of the vehicle to the second status indicator of the vehicle,
in response to receipt of the first signal, provide a status indicator change signal that causes the display plate to display the second status indicator of the vehicle such that the second status indictor of the vehicle is visible through the cutout of the license plate, and
transmit, from the antenna to a server remote from the vehicle and before receipt of the first signal, a second signal indicating a request for updated status information associated with the vehicle.

2. The apparatus of claim 1, wherein the electronic display is an electronic paper.

3. The apparatus of claim 1, wherein the antenna is configured to communicate information associated with the status indicator of the vehicle to at least one of a network, a mobile device or a wireless access point located within the vehicle.

4. The apparatus of claim 1, wherein the aperture of the license plate is a cutout in the license plate made after manufacturing of the license plate.

5. The apparatus of claim 1, further comprising:
the license plate coupled to the first side of the display plate, wherein the vehicle identification indicia is displayed thereon in a reflective paint.

6. The apparatus of claim 1, further comprising:
an energy harvester coupled to the display plate and configured to receive energy from a surrounding environment of the vehicle, the energy harvester configured to power the electronic display.

7. The apparatus of claim 1, further comprising:
a global positioning system (GPS) module coupled to the display plate and configured to track at least one of a location of the vehicle, a speed of the vehicle, or a mileage of the vehicle.

8. A method, comprising:
displaying, on a display plate mounted to a vehicle, a first status indicator of the vehicle, the display plate being coupled to a license plate having a cutout, the first status indicator of the vehicle displayed on the display plate being visible through the cutout of the license plate;
receiving, at an antenna of the display plate, a signal from a remote server indicating a change from the first status indicator of the vehicle to a second status indicator of the vehicle;
in response to the receiving, displaying the second status indicator of the vehicle on the display plate such that the second status indicator of the vehicle is visible through the cutout of the license plate; and
transmitting, from the antenna of the display plate and using energy from a battery electrically isolated from the vehicle, to a server remote from the vehicle, a second signal indicating a request for updated status information associated with the vehicle.

9. The method of claim 8, wherein the first status indicator of the vehicle indicates that the vehicle is compliant with vehicle regulations, the second status indicator of the vehicle indicates that the vehicle is non-compliant with the vehicle regulations.

10. The method of claim 8, wherein the displaying the first status indicator of the vehicle includes displaying the first status indicator of the vehicle on the display plate during a time period without using power.

11. An apparatus, comprising:
a vehicle plate configured to be mounted to an external surface of a vehicle, the vehicle plate having a vehicle identification indicia printed thereon;
an electronic display adjacent to the vehicle plate such that the electronic display is mounted to the external surface of the vehicle with the vehicle plate, at least a portion of the electronic display being visible with the identification information of the vehicle plate, the electronic display configured to display a first status indicator of the vehicle during a first time period and a second status indicator of the vehicle during a second time period mutually exclusive of the first time period, the first status indicator of the vehicle being visible with the identification information of the vehicle plate during the first time period, the second status of the vehicle being visible with the identification information of the vehicle plate during the second time period;
an antenna; and
a transceiver coupled to the antenna and to a battery electrically isolated from the vehicle for providing energy to the transceiver for operation thereof, wherein the transceiver is configured to
receive from the antenna a first signal from a remote server indicating a change from the first status indicator of the vehicle to the second status indicator of the vehicle,
in response to receipt of the first signal, provide a status indictor change signal that causes the electronic display to display the second status indicator of the vehicle such that the second status indictor of the vehicle is visible through the cutout of the license plate, and
transmit, from the antenna to a server remote from the vehicle and before receipt of the first signal, a second signal indicating a request for updated status information associate with the vehicle.

12. The apparatus of claim 11, wherein the vehicle plate includes an aperture that is offset from the vehicle identification indicia, the first status indicator of the vehicle being visible through the aperture of the vehicle plate during the first time period, the second status of the vehicle being visible through the aperture of the vehicle plate during the second time period.

13. The apparatus of claim 12, wherein the aperture of the vehicle plate is a first aperture, the electronic display being a first electronic display, the vehicle plate including a second aperture, the apparatus further comprising:
a second electronic display adjacent to the vehicle plate such that the electronic display is mounted to the external surface of the vehicle with the vehicle plate, the second electronic display configured to display information associated with the vehicle, the information associated with the vehicle being visible through the second aperture of the vehicle plate.

14. The apparatus of claim 11, further comprising:
a battery coupled to the electronic display and configured to supply power to the electronic display between the first time period and the second time period, the electronic display being operational during the first time period and the second time period without power supplied from the battery.

15. The apparatus of claim 11, further comprising:
an antenna electrically coupled to the electronic display and configured to communicate at least one of the first status indicator of the vehicle or the second status indicator of the vehicle to at least one of a network, a mobile device or a wireless access point located within the vehicle.

16. The apparatus of claim 11, wherein the identification information of the vehicle is an identification number of the vehicle displayed thereon in a reflective paint.

17. The apparatus of claim 11, further comprising:
a radio frequency identification (RFID) tag adjacent to the electronic display when the electronic display is mounted on the vehicle, the RFID tag configured to send an electrical signal representing identification information of the vehicle.

* * * * *